UNITED STATES PATENT OFFICE.

JAS. J. HARRISON, OF ST. MICHAEL'S, MARYLAND.

IMPROVED COMPOSITION FOR PRESERVING MEAT.

Specification forming part of Letters Patent No. 56,217, dated July 10, 1866.

*To all whom it may concern:*

Be it known that I, JAMES J. HARRISON, of St. Michael's, in the county of Talbot and State of Maryland, have invented a new and useful Composition for Preserving Meat, &c.; and I do hereby declare the following to be a full, clear, and exact description of the nature of the same, sufficient to enable one skilled in the art to which it appertains to compound and use the same.

The composition consists of a solution of salts, into which the meat, &c., is dipped and allowed to remain for awhile, after which it is lifted out of the pickle and hung up to dry, or it may be poured into vessels containing provisions, or upon skins or hides.

The composition is as follows: Eight pounds salt, four pounds alum, two pounds concentrated saltpeter. This is dissolved in water to such a strength that the solution will bear up an egg and show the size of an American quarter-dollar piece.

The meat must be left in the pickle for a time varying with the circumstances of the case—from five minutes to an hour.

If it is desired to keep a piece of meat fresh for a few days in summer-time, it may be dipped for a few minutes in the solution, and then hung up to dry, when it will keep sweet for a week. If it be desired to keep it several months, it may be left in from thirty minutes to an hour.

Meat showing a raw surface will probably require a little longer time in pickle than pieces surrounded by a natural skin, as birds, some drying pieces of beef, &c.

The salts appear to absorb a portion of the juices of the exterior surface, which is so hardened as to close the interior portions against the ordinary action of the atmosphere.

The meat is not salted through, nor does the interior portion appear to be materially dried or affected in appearance or taste.

The solution may be added to oysters—a few tea-spoonfuls to the quart of oysters—and if rendered too salt thereby the oysters can be washed with clear water.

As a solution for treating hides it has proved valuable and effective, preserving them sweet when afterward exposed to the air in warm weather.

Eggs dipped in the solution and afterward dried become incrusted and preserved.

What I claim as new, and desire to secure by Letters Patent, is—

The composition consisting of the ingredients, in about the proportions and for the purpose described.

J. J. HARRISON.

Witnesses:
EDWARD H. KNIGHT,
ALEXR. A. C. KLAUCKE.